United States Patent
Berg et al.

(10) Patent No.: US 12,423,967 B2
(45) Date of Patent: Sep. 23, 2025

(54) METHOD OF AUGMENTING THE NUMBER OF LABELED IMAGES FOR TRAINING A NEURAL NETWORK

(71) Applicants: AGFA NV, Mortsel (BE); VRVIS Zentrum für Virtual Reality und Visualisierung Forschungs-GmbH, Vienna (AT)

(72) Inventors: Astrid Berg, Mortsel (BE); Eva Vandersmissen, Mortsel (BE); Katja Buehler, Mortsel (BE)

(73) Assignees: Agfa NV, Mortsel (BE); VRVIS Zentrum füVirtual Reality und Visualisierung Forschungs—GmbH, Vienna (AT)

( * ) Notice: Subject to any disclaimer, the term of this patent is extended or adjusted under 35 U.S.C. 154(b) by 343 days.

(21) Appl. No.: 18/247,559

(22) PCT Filed: Oct. 1, 2021

(86) PCT No.: PCT/EP2021/077050
§ 371 (c)(1),
(2) Date: Mar. 31, 2023

(87) PCT Pub. No.: WO2022/073856
PCT Pub. Date: Apr. 14, 2022

(65) Prior Publication Data
US 2023/0377323 A1    Nov. 23, 2023

(30) Foreign Application Priority Data
Oct. 6, 2020   (EP) .................................... 20200295

(51) Int. Cl.
*G06V 10/82*   (2022.01)
*G06V 10/74*   (2022.01)
*G06V 10/75*   (2022.01)
*G06V 10/774*  (2022.01)

(52) U.S. Cl.
CPC ............ *G06V 10/82* (2022.01); *G06V 10/758* (2022.01); *G06V 10/761* (2022.01); *G06V 10/7753* (2022.01)

(58) Field of Classification Search
None
See application file for complete search history.

(56) References Cited

U.S. PATENT DOCUMENTS

| 2020/0160977 A1* | 5/2020 | Lyman ................... G06F 18/217 |
| 2020/0364857 A1* | 11/2020 | Moen .................... G06T 11/001 |
| 2023/0059924 A1* | 2/2023 | Heinrich ................. G06T 1/20 |

FOREIGN PATENT DOCUMENTS

WO   WO-2022132967 A1 *  6/2022  ............. A61B 6/468

OTHER PUBLICATIONS

European Patent Office, International Search Report in International Patent Application No. PCT/EP2021/077050, mailed Jan. 18, 2022, 4 pp.
European Patent Office, Written Opinion in International Patent Application No. PCT/EP2021/077050, mailed Jan. 18, 2022, 6 pp.
Ma, "Histogram Matching Augmentation for Domain Adaptation with Application to Multi-centre, Multi-vendor and Multi-disease Cardiac Image Segmentation," 11th Int. Workshop, STACOM 2020, Held in Conjunction with MICCAI 2020, Lima, Peru, Oct. 4, 2020, Revised Selected Papers, *Lecture Notes in Computer Science*, 12592: 177-186 (2021).

* cited by examiner

*Primary Examiner* — Soo Shin
(74) *Attorney, Agent, or Firm* — Leydig, Voit & Mayer, Ltd.

(57) ABSTRACT

A method of augmenting the number of labeled images for training a neural network comprising the steps of—Starting from a dataset of labeled images with corresponding segmentation masks and a dataset of unlabeled images, gathering for a given image i in a data set of labeled images a number of images with similar metadata in said dataset of unlabeled images so as to form data sub-set Sim i,—Training a multiclass segmentation neural network on said labeled images thereby generating segmentation masks for the images in subset Sim i,—On the basis of these segmentation masks judging similarity between images of Sim i and image i and finding the most similar image(s) in Sim i by computing and comparing histograms of segmentation masks of image i and images in Sim i—Transferring the histogram of the most similar images in Sim i to given image i.

4 Claims, No Drawings

METHOD OF AUGMENTING THE NUMBER OF LABELED IMAGES FOR TRAINING A NEURAL NETWORK

CROSS-REFERENCE TO RELATED APPLICATIONS

This patent application is the U.S. national stage of copending International Patent Application No. PCT/EP2021/077050, filed Oct. 1, 2021, which claims the benefit of European Patent Application No. 20200295.2, filed Oct. 6, 2020.

FIELD OF THE INVENTION

The present invention is in the field of neural networks and more specifically relates to the aspect of improving the training of neural networks in case of a limited number of available labeled training data. The method of this invention is in particular useful in the field of radiographic image segmentation but is not limited thereto.

BACKGROUND OF THE INVENTION

Image segmentation is a digital image processing technique in which an image is partitioned into a number of sets of pixels, by assigning a label to each pixel (annotating) and collecting pixels with similar label in one of these sets. Pixels are assigned a label based on their semantics.

The goal of this image segmentation technique is to obtain an image representation that is easier to analyse, e.g. by locating objects or boundaries in an image.

In digital image processing of medical images in particular, pixel-wise annotation for segmentation tasks is laborious. Therefore, situations are often faced in which there are only few labeled and many unlabeled images.

The labeled images usually only cover a subset of the possible data spectrum that the algorithm should be applied to.

This problem is commonly solved in the prior art by applying augmentation techniques.

However, for medical images it is very hard to obtain acceptable realistic result when applying the prior art augmentation techniques.

Shape appearance augmentation is usually handled through geometric transforms (examples are: flipping, rotating, but also elastic warping).

Different elements have an influence on whether or not brightness variations are realistic for medical images. Among these factors are the type of scanner used for acquiring the medical image, the applied dose, the type of object or body part that is scanned, the image composition in terms of background/body part/ . . . , whether or not collimation was applied, whether or not foreign objects are present (for example implants, metal objects such as buttons etc.), the share of background and foreground in the image etc.

There are several ways to overcome this problem:

One of them is to apply a "one fits all" technique in which a histogram modification strategy is considered and applied to all images. The histogram is changed according to fixed rules (for example by changing the brightness of an image by adding a fixed constant to every pixel). Many different modification strategies seem possible, but their limitation is that the strategies have to be defined up front within certain boundaries (for example adding a value too high would make the image unrealistically bright). Since this technique is not adapted to images individually it may not be suitable for all types of images.

Furthermore this type of techniques is dependent on parameters that are specified upfront.

Another technique is an individual histogram augmentation technique wherein different types of body parts are subjected to different types of augmentation strategies. It might be difficult however to find a number of such applicable strategies and it is highly dependent on the dataset.

Still another method might be to learn via artificial intelligence suitable augmentation strategies leading to good results. However, this is difficult, might take a lot of time and requires adequate data selection.

It is an aspect of the present invention to provide a solution to the above-mentioned problems.

SUMMARY OF THE INVENTION

To overcome the above-mentioned aspects the invention provides a method having the specific features set out in claim 1.

Specific features for preferred embodiments of the invention are set out in the dependent claims.

According to this invention histograms of unlabeled data are used to augment a dataset of labeled images and to create in this way a more diverse and much bigger training dataset for a neural network so that the training of the neural network and consequentially also the output of a neural network is improved.

The invention is applicable in various fields among which segmentation, classification, object detection etc.

The invention is however very suitable for segmentation specifically of medical images by means of a trained neural network since it overcomes the problems specific for the medical imaging field which are described higher.

The present invention is advantageous in that training neural networks will be robust to the brightness changes that will occur realistically in medical images when few labeled images are available.

The invention is further advantageous in that it provides an efficient way of augmenting data without manually crafted features.

By applying the method of this invention medically realistic augmentations are produced. The histograms of the augmentations come from actual medical images.

With histogram augmentation, the histogram is not just shifted or dampened but the histogram curve is adjusted to mimic the histogram of a different medical image.

The method is able to mimic properties of real histograms, including, but not limited to gaps in values (the histogram is not continuous, some values might not be present), shifted minima and maxima and ranges (If an image is stored for example as unsigned integer 16, the range of the X-ray does not always start at 0 and goes to 65535), different number of unique values (some X-rays only cover 4000 values, some cover 20000)

DETAILED DESCRIPTION OF THE INVENTION

Although the invention will be explained with reference to segmentation task of medical images, it is not limited to this application nor to this type of images.

The method is applicable to augment the number of labeled data for training neural networks for all types of tasks and all types of images.

A digital signal representation of a medical image to which a neural network is applied can be acquired in several image acquisition ways among which are X-ray imaging, MRI, CT scanning . . . .

The digital image representation can be acquired directly or can be acquired via the intermediary of an image recording medium such as a photographic film or a photostimulable phosphor screen etc. In the latter situation the recording material is read out and the read out signal is digitized before a neural network is applied to it.

The image is identified by its metadata among which are data regarding the patient identification, the body part identification and the acquisition.

The method of the present invention is thus applied to digital signal representations of an image and generally comprises the following steps:

The method starts with a small dataset of images and their segmentation masks (further on referred to as labeled images) and a larger dataset of unlabeled images. The segmentation masks should provide information about the composition of the image. For example for X-Ray data these segmentation masks can consist of five classes: background, bone area, collimation area, soft tissue, foreign object. It will be clear that these classes are only mentioned as an example and that other class types and class definitions may be used, depending in particular on the type of acquisition means.

For a given image i in the labeled dataset, all images which are considered similar in terms of metadata in the unlabeled dataset are gathered and e.g. listed. In this context images are considered similar when e.g. they relate to the same body part, they have the same orientation, the relate to the same gender, they relate to persons with the same age or to persons with the same weight etc. Other metadata types may be envisaged.

With these images a dataset SIM i as a subset of the unlabeled dataset is generated.

Next a neural network for multiclass segmentation is trained on the labeled images and segmentation masks are generated for the images in SIM i.

Based on these segmentation masks similarity between images of SIM i and image i is judged.

Optionally images are first matched on top of each other by means of a predefined registration framework.

For example, images of SIM i onto the given image i are warped by a pre-defined rigid or non-rigid method, Then the next step is applied which consists of computing and comparing histograms of segmentation masks of given image and images in SIM i, e.g. by KL divergence (other methods may be envisaged).

The most similar image(s) in SIM_i have a similar composition to the image i according to this method.

Next the histogram of the newly found most similar image(s) in SIM_i is transferred to given image i.

For training neural networks, the original few labeled images are used together with their histogram augmented versions.

The histogram augmentation step can be done in two ways:

For every labeled image i search through the database for the n closest images in SIM i according to the criteria above. Transfer their histograms onto the labeled image and train with the original image (and its expert labeled annotation) and the histogram augmented versions (with the same labels).

For every image in the unlabeled dataset, transfer its histogram onto the closest image in the labeled dataset according to the criteria above.

The histogram is preferably transferred based on a quantile transformation.

A post-processing step can be applied which manually sorts out unrealistic looking images. Unrealistic images may occur for example, when the most similar image according to the criteria defined above is not similar enough and transferring of the histogram results in an image that appears overexposed or underexposed.

With the method of this invention, even though two images are probably different in terms of what they depict and where they depict it (for example, image 1 showing a hand in the upper left corner, while image 2 showing a different hand in the lower right corner), they can still be similar enough in terms of image composition (image 1 and image 2 can e.g. both consist of approximately 10% hand, 70% background, 20% collimation) such that the histogram can be transferred.

This method is advantageous over the conventional prior approach in which one image would be registered on top of another and then transferring the histogram since registering for example a random hand onto another random hand is complicated and sometimes not realistically possible. One of them might be pictured from the top, while the other might be pictured from the side and usually this is not known without looking at every image individually, which would be time consuming.

The invention claimed is:

1. A method of augmenting the number of labeled images for training a neural network, the method comprising:
    starting from a dataset of labeled images with corresponding segmentation masks and a dataset of unlabeled images,
    gathering for a given image i in a data set of labeled images a number of images with metadata that have at least one item with the same value in said dataset of unlabeled images so as to form a data sub-set Sim i,
    training a multiclass segmentation neural network on said labeled images thereby generating segmentation masks for the images in sub-set Sim i,
    on the basis of these segmentation masks judging similarity between images of Sim i and image i and finding most similar image(s) in Sim i by computing histograms of segmentation masks of image i and images in Sim i and by comparing them, and
    transferring the histogram of the most similar images in Sim i to given image i.

2. The method of claim 1, wherein said image i and images in said sub- set Sim i are registered on top of each other before said histograms are compared.

3. The method of claim 2, wherein as a postprocessing step an image is sorted out when use of such an image would render an overexposed or underexposed result.

4. The method of claim 1, wherein as a postprocessing step an image is sorted out when use of such an image would render an overexposed or underexposed result.

* * * * *

UNITED STATES PATENT AND TRADEMARK OFFICE
CERTIFICATE OF CORRECTION

| | | |
|---|---|---|
| PATENT NO. | : 12,423,967 B2 | Page 1 of 1 |
| APPLICATION NO. | : 18/247559 | |
| DATED | : September 23, 2025 | |
| INVENTOR(S) | : Berg et al. | |

It is certified that error appears in the above-identified patent and that said Letters Patent is hereby corrected as shown below:

On the Title Page

Item (73), please delete "VRVIS Zentrum füVirtual Reality und Visualisierung Forschungs-GmbH" and insert --VRVIS Zentrum für Virtual Reality und Visualisierung Forschungs-GmbH--

Signed and Sealed this
Twenty-eighth Day of October, 2025

John A. Squires
*Director of the United States Patent and Trademark Office*